United States Patent [19]

Cutler

[11] Patent Number: 5,671,900

[45] Date of Patent: Sep. 30, 1997

[54] ADJUSTABLE ARTICLE-HOLDING STAND APPARATUS

[76] Inventor: Daniel James Cutler, 633 W. State Apt. #2-A, Springfield, Mo. 65806

[21] Appl. No.: 533,016

[22] Filed: Sep. 25, 1995

[51] Int. Cl.⁶ .................................................. A47B 97/04
[52] U.S. Cl. ........................... 248/451; 248/462; 248/448; 248/460
[58] Field of Search ..................... 248/448, 451, 248/458, 460, 462, 447.2, 124.1, 125.3, 125.7, 279.1, 287.1

[56] References Cited

U.S. PATENT DOCUMENTS

| | | | |
|---|---|---|---|
| 501,208 | 7/1893 | Howe | 248/462 |
| 1,894,991 | 2/1933 | Hayes | 248/279.1 |
| 2,333,353 | 11/1943 | Zanella | 248/447.2 |
| 2,663,764 | 12/1953 | Holmes | 248/279.1 |
| 2,994,501 | 8/1961 | Barnard | 248/279.1 |
| 3,003,737 | 10/1961 | Mehr | 248/279.1 |
| 3,664,629 | 5/1972 | Reed | 248/445 |
| 3,905,573 | 9/1975 | Davis | 248/445 |
| 4,191,354 | 3/1980 | Chia-Liu | 248/445 |
| 4,294,425 | 10/1981 | Weber | 248/445 |
| 4,355,779 | 10/1982 | Heled | 248/460 |
| 4,718,630 | 1/1988 | Richard | 248/444.1 |
| 4,754,945 | 7/1988 | Diamond | 248/458 |
| 5,174,531 | 12/1992 | Perakis | 248/124.1 |

*Primary Examiner*—Ramon O. Ramirez
*Assistant Examiner*—Gwendolyn W. Baxter

[57] ABSTRACT

An adjustable article-holding stand apparatus includes a base assembly and an adjustable vertical riser assembly connected to the base assembly. A vertical-to horizontal swivel assembly has a first portion and a second portion, and the first portion of the vertical-to-horizontal swivel assembly is connected to the adjustable vertical riser assembly. An adjustable horizontal arm assembly is connected to the second portion of the vertical-to-horizontal swivel assembly, and an adjustable-length article-holding assembly is connected to the adjustable horizontal arm assembly. The adjustable-length article-holding assembly can include an auxiliary-device-adaptor assembly connected thereto. A lamp assembly is connected to the adjustable-length article-holding assembly. The base assembly includes primary base portion connected to the adjustable vertical riser assembly. An adjustable base portion is adjustably connected to the primary base portion. A base-leg-adjustment lock assembly is supported by the primary base portion for locking an adjusted position of the adjustable base portion with respect to the primary base portion. The adjustable-length article-holding assembly is connected to the adjustable horizontal arm assembly by a rotatably adjustable connection along a rotational axis extending through an end portion of the adjustable horizontal arm assembly and an end portion of the adjustable-length article-holding assembly. In another embodiment, the base assembly can include a substrate-gripper assembly connected to the adjustable vertical riser assembly.

19 Claims, 5 Drawing Sheets

ADJUSTABLE ARTICLE-HOLDING STAND APPARATUS

BACKGROUND OF THE INVENTION

1. Field of the Invention

The present invention relates generally to article-holding devices and, more particularly, to article-holding devices especially adapted for holding an article in an adjusted orientation which is convenient for viewing by a person who may be in a variety of orientations.

2. Description of the Prior Art

When persons view articles, the persons are often in a variety of orientations, and the articles may have to be orientated so that the person can adequately view the articles. For example, a person may be in a variety of orientations when reading a book or magazine. The person may be seated in a chair; the person may be standing; the person may be lying down in a bed. When seated in a chair, the person may be near a desk; or the person may be away from a desk. In each of these personal orientations, it may be desirable for the person to be able to read a book in a hands-free manner. In this respect, it would be desirable if a book-holding device permitted a person to read a book in a hands-free manner with the person being oriented in a wide variety of orientations.

Throughout the years, a number of innovations have been developed relating to holding books in a hands-free manner, and the following U.S. Pat. Nos. are representative of some of those innovations: 3,664,629; 3,905,573; 4,191,354; 4,294,425; and 4,718,630. More specifically, each of the above-mentioned U.S. patents discloses a book-holding device specifically designed for holding a book overhead a person who is in a reclining position, such as lying down in bed.

More specifically, each of U.S. Pat. Nos. 3,664,629 and 4,718,630 discloses an adjustable stand which has vertical and tilt adjustments, but which does not provide a horizontal adjustment. In this respect, it would be desirable if a book-holding device had a horizontal adjustment. Moreover, each of U.S. Pat. Nos. 3,644,629 and 4,718,630 discloses that the book-holding device is supported by the mattress of the bed. Since having such a device supported by the mattress restricts the available surface area of the mattress for movement of the person, it would be desirable if a book-holding device were not supported by a mattress of a bed.

U.S. Pat. No. 3,905,573 discloses a book-holding device which is attached to the frame of a bed. Such an attachment can restrict access to the bed by the person. Therefore, it would be desirable ff a book-holding device were not supported by the frame of a bed. U.S. Pat. No. 4,191,354 discloses another reading rack attached to a bed.

U.S. Pat. No. 4,294,425 discloses an overhead book-holding device which uses suspension lines for suspending the book holder. By their very nature, suspension lines are flexable, and, as a result, the book-holding device may tend to be unsteady and swing. In this respect, it would be desirable if a book-holding device avoided the use of flexable suspension lines.

Still other features would be desirable in a book-holding device. For example, it would be desirable ff a book-holding device were supported by a floor as opposed to a mattress or bed frame. It would also be desirable if a book-holding device had optional adaptability to the type of support that were used.

More specifically, it would be desirable if a book-holding device could optionally be supported by a desk, table, or other elevated horizontal or vertical surfaces.

Adjustability is important in a book-holding device or other article-holding device. Preferably, adjustability should be provided for both vertical adjustment and horizontal adjustment for a book reader or article user who is in a wide variety of personal orientations. Moreover, it would be desirable if a book-holding device provided adjustability for a wide variety of books or other articles to be held.

A floor-supported book or other article-holding device has a base which supports the entire device. The length of the base is extremely important with regard to the stability of the device. If the base is not sufficiently long, the device may be unstable. In this respect, it would be desirable if a book-holding device had a base whose length were adjustable.

Thus, while the foregoing body of prior art indicates it to be well known to use article-holding devices, the prior art described above does not teach or suggest an article-holding device which has the following combination of desirable features: (1) permits a person to read a book in a hands-free manner with the person being oriented in a wide variety of orientations; (2) has a horizontal adjustment; (3) is not supported by a mattress of a bed; (4) is not supported by the frame of a bed; (5) avoids the use of flexible suspension lines; (6) is supported by a floor; (7) can optionally be supported by a desk, table, or other elevated horizontal surface; (8) provides adjustability for both vertical adjustment and horizontal adjustment for a book reader or article user who is in a wide variety of personal orientations; (9) provides adjustability for a wide variety of books or other articles to be held; and (10) has a base whose length is adjustable. The foregoing desired characteristics are provided by the unique adjustable article-holding stand apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an adjustable article-holding stand apparatus which includes a base assembly, and an adjustable vertical riser assembly is connected to the base assembly. A vertical-to-horizontal swivel assembly has a first portion and a second portion, and the first portion of the vertical-to-horizontal swivel assembly is connected to the adjustable vertical riser assembly. An adjustable horizontal arm assembly is connected to the second portion of the vertical-to-horizontal swivel assembly, and an adjustable-length article-holding assembly is connected to the adjustable horizontal arm assembly. A swivel-to-vertical-riser lock assembly is connected to the adjustable vertical riser assembly for locking a connection between the adjustable vertical riser assembly and the vertical-to-horizontal swivel assembly.

The adjustable-length article-holding assembly includes a connector portion for connecting the adjustable-length article-holding assembly to the adjustable horizontal arm assembly. A first telescopic member is connected to the connector portion. A first clamp assembly is connected to the first telescopic member. A second telescopic member is slidingly connected to the first telescopic member. A locking assembly is provided for locking the second telescopic member with respect to the first telescopic member, and a second clamp assembly is connected to the second telescopic member. The first clamp assembly and the second clamp assembly include spring clamp members.

The adjustable-length article-holding assembly includes an auxiliary-device-adaptor assembly connected thereto. The auxiliary-device-adaptor assembly is connected to an end portion of the second clamp assembly. A magnifying glass assembly is connected to the auxiliary-device-adaptor assembly. The magnifying glass assembly includes an extension arm which is rotatably connected to the auxiliary-device-adaptor assembly, and a magnifying lens assembly is connected to the extension arm.

A lamp assembly is connected to the adjustable-length article-holding assembly. The lamp assembly can be either powered by AC current or powered by DC current from a battery supply.

The base assembly extends sufficiently horizontally such that the base assembly extends beyond a center of gravity of the apparatus such that the base assembly supports the apparatus in a free-standing manner without tipping over. The base assembly includes primary base portion connected to the adjustable vertical riser assembly. An adjustable base portion is adjustably connected to the primary base portion. A base-leg-adjustment lock assembly is supported by the primary base portion for locking an adjusted position of the adjustable base portion with respect to the primary base portion.

An adjustable foot assembly is adjustably connected to the adjustable base portion. The primary base portion includes a plurality of connector members arrayed along a top surface of the primary base portion.

The adjustable vertical riser assembly includes a plurality of telescoping riser members which are serially connected to each other and are connected between the base assembly and the adjustable horizontal arm assembly. A plurality of riser lock assemblies are connected to selected telescoping riser members for locking adjacent telescoping riser members to each other. The adjustable horizontal arm assembly includes a plurality of articulated arm members which are serially connected to each other and which are connected between the vertical-to-horizontal swivel assembly and the adjustable-length article-holding assembly. A plurality of arm lock assemblies are connected to adjacent articulated arm members for locking selected orientations of adjacent articulated arm members with respect to each other.

The adjustable-length article-holding assembly is connected to the adjustable horizontal arm assembly by a rotatably adjustable connection along a rotational axis extending through an end portion of the adjustable horizontal arm assembly and an end portion of the adjustable-length article-holding assembly. A swivel-to-horizontal-arm lock assembly is connected to the adjustable horizontal arm assembly for locking a connection between the adjustable horizontal arm assembly and the vertical-to-horizontal swivel assembly.

The base assembly includes a substrate-gripper assembly connected to the adjustable vertical riser assembly. The adjustable horizontal arm assembly includes a plurality of telescoping arm members serially connected to each other and connected between the vertical-to-horizontal swivel assembly and the adjustable-length article-holding assembly. A plurality of telescopic arm lock assemblies are connected to selected telescoping arm members for locking adjacent telescoping arm members to each other.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable article-holding stand apparatus which has all of the advantages of the prior art and none of the disadvantages.

It is another object of the present invention to provide a new and improved adjustable article-holding stand apparatus which may be easily and efficiently manufactured and marketed.

It is a further object of the present invention to provide a new and improved adjustable article-holding stand apparatus which is of durable and reliable construction.

An even further object of the present invention is to provide a new and improved adjustable article-holding stand apparatus which is susceptible of a low cost of manufacture with regard to both materials and labor, and which accordingly is then susceptible of low prices of sale to the consuming public, thereby making such adjustable article-holding stand apparatus available to the buying public.

Still yet a further object of the present invention is to provide a new and improved adjustable article-holding stand apparatus which permits a person to read a book in a hands-free manner with the person being oriented in a wide variety of orientations.

Still another object of the present invention is to provide a new and improved adjustable article-holding stand apparatus that has a horizontal adjustment.

Yet another object of the present invention is to provide a new and improved adjustable article-holding stand apparatus which is not supported by a mattress of a bed.

Even another object of the present invention is to provide a new and improved adjustable article-holding stand apparatus that is not supported by the frame of a bed.

Still a further object of the present invention is to provide a new and improved adjustable article-holding stand apparatus which avoids the use of flexible suspension lines.

Yet another object of the present invention is to provide a new and improved adjustable article-holding stand apparatus that is supported by a floor.

Still another object of the present invention is to provide a new and improved adjustable article-holding stand apparatus which can optionally be supported by a desk, table, or other elevated horizontal surface.

Yet another object of the present invention is to provide a new and improved adjustable article-holding stand apparatus that provides adjustability for both vertical adjustment and horizontal adjustment for a book reader or article user who is in a wide variety of personal orientations.

Still a further object of the present invention is to provide a new and improved adjustable article-holding stand apparatus that provides adjustability for a wide variety of books or other articles to be held.

Yet another object of the present invention is to provide a new and improved adjustable article-holding stand apparatus which has a base whose length is adjustable.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved adjustable article-holding stand apparatus embodying the principles and concepts of the present invention will be described.

Turning to FIGS. 1–4, there is shown a first embodiment of the adjustable article-holding stand apparatus of the invention generally designated by reference numeral 10. The adjustable article-holding stand apparatus 10 includes a base assembly 12, and an adjustable vertical riser assembly 14 is connected to the base assembly 12. A vertical-to-horizontal swivel assembly 16 has a first portion 18 and a second portion 20, and the first portion 18 of the vertical-to-horizontal swivel assembly 16 is connected to the adjustable vertical riser assembly 14. An adjustable horizontal arm assembly 22 is connected to the second portion 20 of the vertical-to-horizontal swivel assembly 16, and an adjustable-length article-holding assembly 24 is connected to the adjustable horizontal arm assembly 22. A swivel-to-vertical-riser lock assembly 23 is connected to the adjustable vertical riser assembly 14 for locking a connection between the adjustable vertical riser assembly 14 and the vertical-to-horizontal swivel assembly 16.

Figure 7:
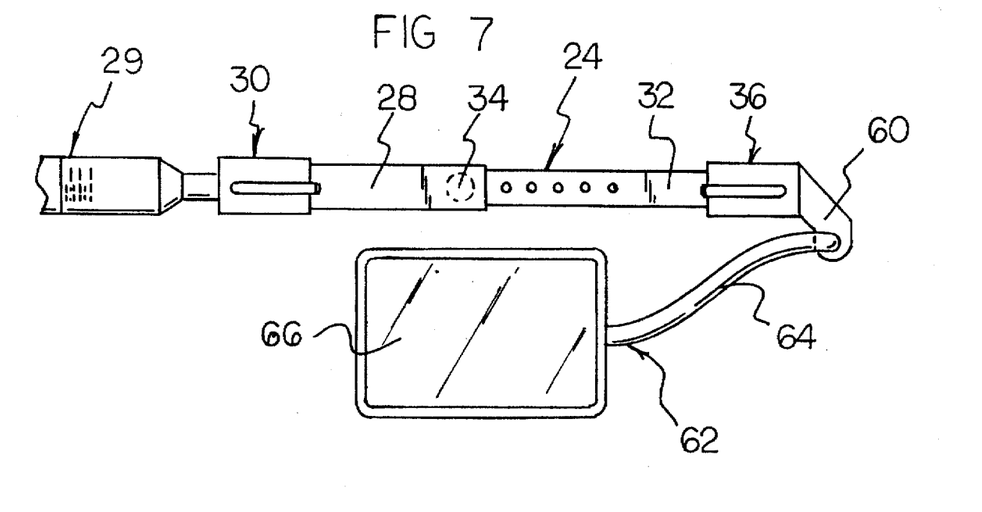
FIG. 7 top view of an article-holding portion of the invention which includes an adaptor and a magnifying glass supported by the adaptor.

The adjustable-length article-holding assembly 24 includes a connector portion 26 for connecting the adjustable-length article-holding assembly 24 to the adjustable horizontal arm assembly 22. A first telescopic member 28 is connected to the connector portion 26. A first clamp assembly 30 is connected to the first telescopic member 28. A second telescopic member 32 is slidingly connected to the first telescopic member 28. A locking assembly 34 is provided for locking the second telescopic member 32 with respect to the first telescopic member 28, and a second clamp assembly 36 is connected to the second telescopic member 32. The first clamp assembly 30 and the second clamp assembly 36 include spring clamp members As shown in FIG. 7, the adjustable-length article-holding assembly 24 includes an auxiliary-device-adaptor assembly 60 connected thereto. More specifically, The auxiliary-device-adaptor assembly 60 is connected to an end portion of the second clamp assembly 36. A magnifying glass assembly 62 is connected to the auxiliary-device-adaptor assembly 60. The magnifying glass assembly 62 includes an extension arm 64 which is rotatably connected to the auxiliary-device-adaptor assembly 60, and a magnifying lens assembly 66 is connected to the extension arm 64.

Figure 2:
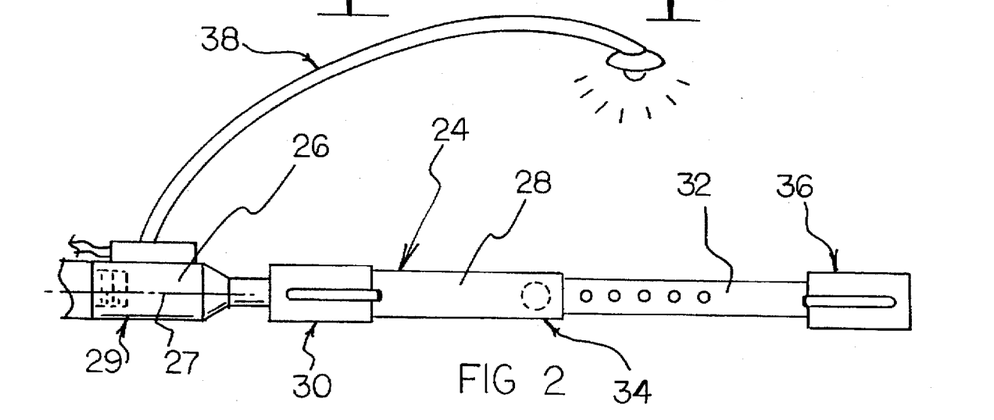
FIG. 2 is an enlarged view of the lamp and book-holding portion of the embodiment of the invention shown in FIG. 1.
Figure 3:
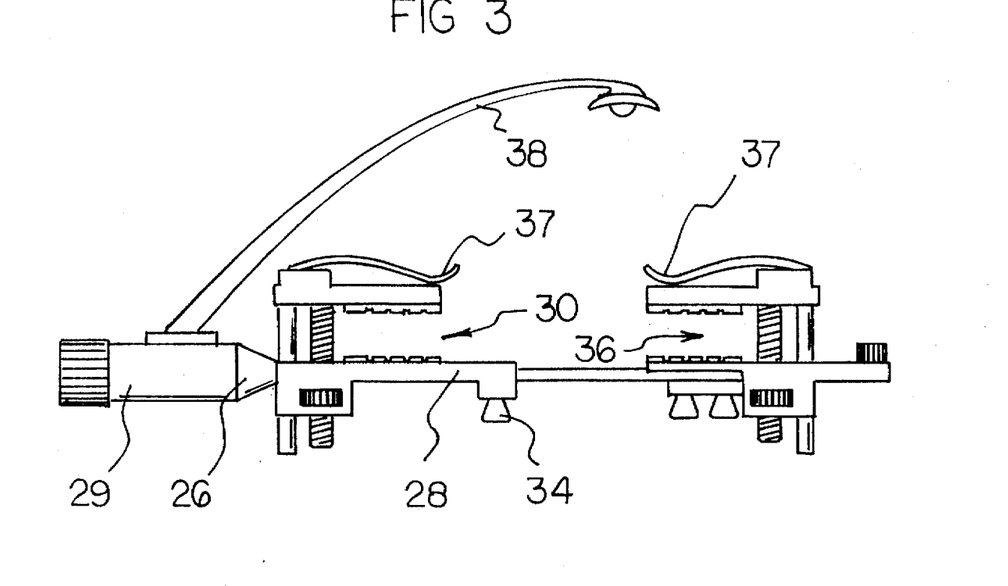
FIG. 3 is a top view of the embodiment of the invention shown in FIG. 2 taken along line 3—3 thereof.
Figure 4:
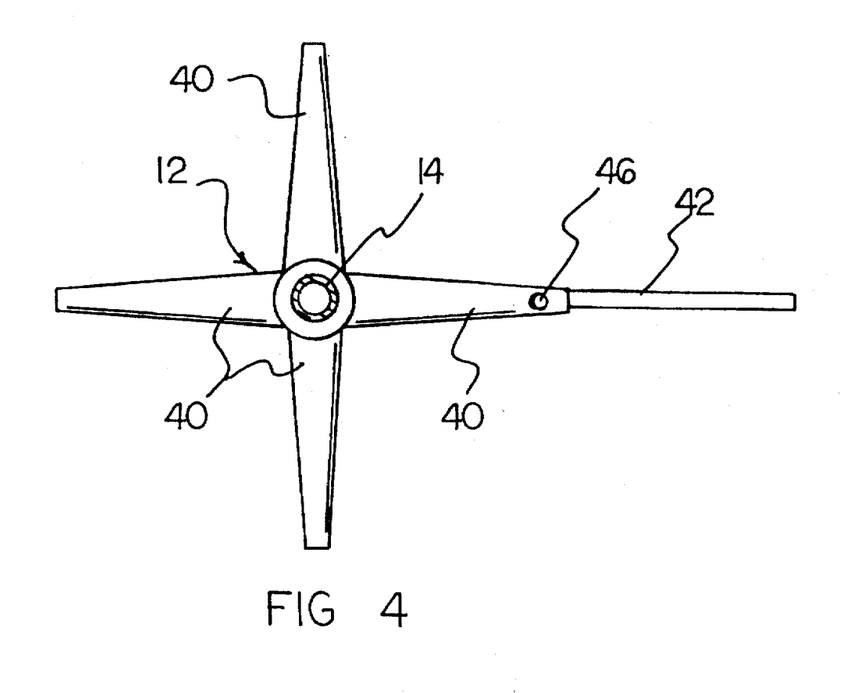
FIG. 4 is a top cross-sectional view of the embodiment of the invention shown in FIG. 1 taken along line 4—4 of FIG. 1.

A lamp assembly 38 is connected to the adjustable-length article-holding assembly 24. The lamp assembly 38 can be either powered by AC current or powered by DC current from a battery supply.

Figure 1:
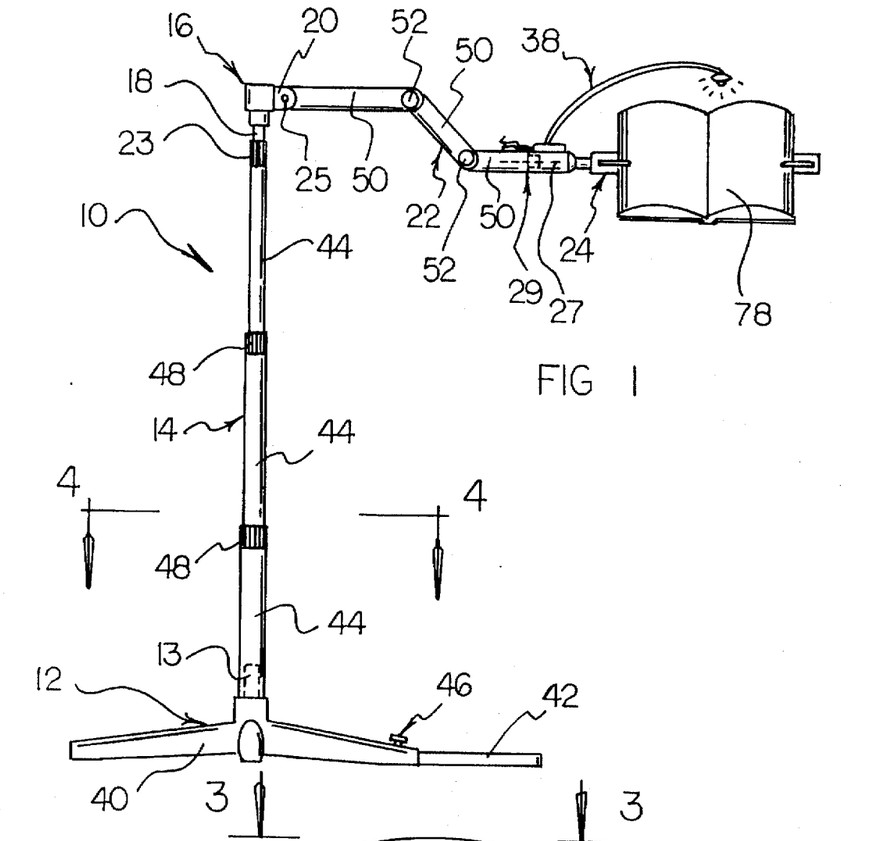
FIG. 1 is a side view showing a first embodiment of the adjustable article-holding stand apparatus of the invention.

The base assembly 12 extends sufficiently horizontally such that the base assembly 12 extends beyond a center of gravity of the apparatus such that the base assembly 12 supports the apparatus in a free-standing manner without tipping over. The base assembly 12 includes primary base portion 40 connected to the adjustable vertical riser assembly 14. An adjustable base portion 42 is adjustably connected to the primary base portion 40. By extending the adjustable base portion 42 horizontally out from the primary base portion 40 toward the article-holding assembly 24 in a plane parallel to the article-holding assembly 24, the effective length of the base assembly 12 extends sufficiently horizontally so that the base assembly 12 extends beyond the center of gravity of the apparatus. In this way, the base assembly 12 supports the apparatus in a free-standing manner without tipping over. base-leg-adjustment lock assembly 46 is supported by the primary base portion 40 for locking an adjusted position of the adjustable base portion 42 with respect to the primary base portion 40.

Figure 8:
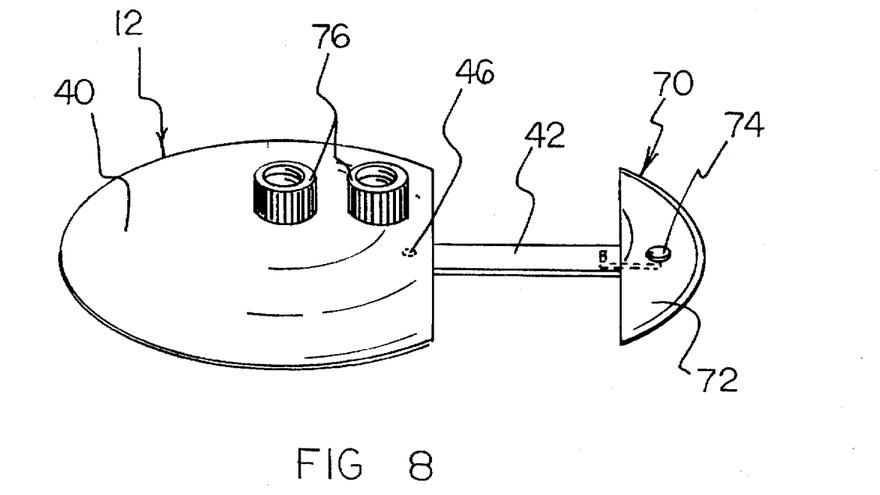
FIG. 8 is a perspective view of a second embodiment of an adjustable-length base of the invention.

Another variation of the base assembly 12 which has a primary base portion 40 and an adjustable base portion 42 is illustrated in FIG. 8. More specifically, adjustable foot assembly 70 is adjustably connected to the adjustable base portion 42.

The adjustable foot assembly 70 further includes a foot member 72 which is adjustably connected to the adjustable base portion 42. A foot lock assembly 74 is connected to the foot member 72 for locking the foot member 72 at an adjusted position on the adjustable base portion 42.

Figures 9, 10, 11:
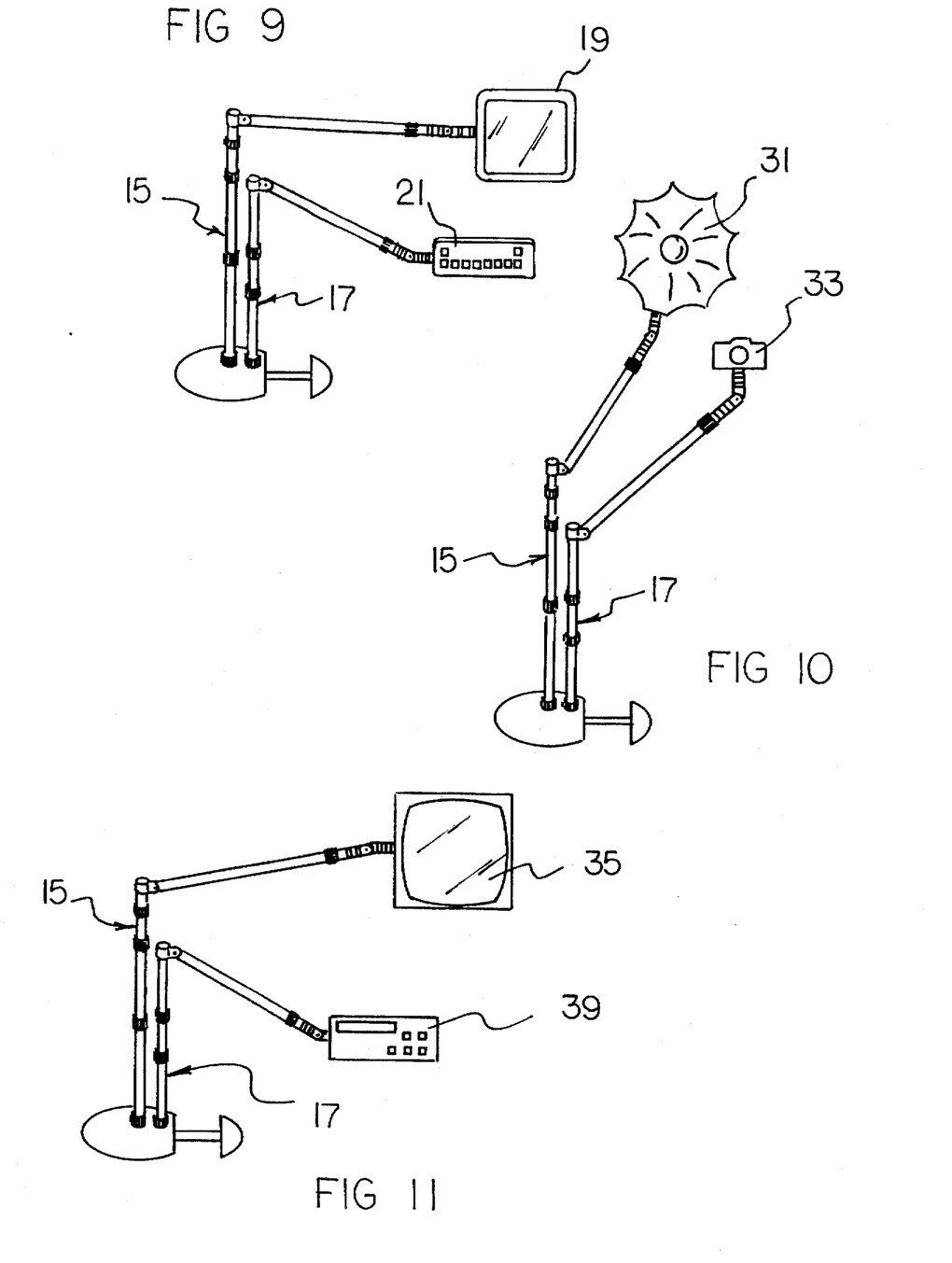
FIG. 9 is a perspective view of an embodiment of the invention which includes a first vertical riser assembly used to ultimately support a computer screen, and a second vertical riser assembly is used to ultimately support a keyboard.
FIG. 10 is a perspective view of an embodiment of the invention which includes a first vertical riser assembly used to ultimately support a photography lighting unit, and a second vertical riser assembly is used to ultimately support a camera.
FIG. 11 is a perspective view of an embodiment of the invention which includes a first vertical riser assembly is used to ultimately support a television screen, and a second vertical riser assembly is used to ultimately support a VCR and TV control unit.

The primary base portion 40 includes a plurality of connector members 76 arrayed along a top surface of the primary base portion 40. As shown in FIGS. 9–11, each of the connector members 76 can be used to support a separate and distinct vertical riser assembly 14 for supporting a different object. One of the vertical riser assemblies 14 can be relatively tall and can be used to support a first object. A second vertical riser assembly 14 can be relatively shorter and can be used to support a second object.

In FIG. 9, a first vertical riser assembly 15 is used to ultimately support a computer screen 19, and a second vertical riser assembly 17 is used to ultimately support a keyboard 21.

In FIG. 10, a first vertical riser assembly 15 is used to ultimately support a photography lighting unit 31, and a second vertical riser assembly 17 is used to ultimately support a camera 33.

In FIG. 11, a first vertical riser assembly 15 is used to ultimately support a television screen 35, and a second vertical riser assembly 17 is used to ultimately support a VCR and TV control unit 39.

In another type of utilization of the plurality of connector members 76, the connector members 76 are provided so that a particular adjustable vertical riser assembly 14 can be selectably located in its position of connection to the primary base portion 40. One position or another position of connection on the primary base portion 40 may be important, depending upon the location of the composite center of gravity of the remaining components of the adjustable article-holding stand apparatus 10 and the article, e.g. book 78, carried by the adjustable-length article-holding assembly 24.

As shown in FIG. 1, the adjustable vertical riser assembly 14 includes a plurality of telescoping riser members 44 which are serially connected to each other and are connected between the base assembly 12 and the adjustable horizontal arm assembly 22. A plurality of riser lock assemblies 48 are connected to selected telescoping riser members 44 for locking adjacent telescoping riser members 44 to each other. The adjustable horizontal arm assembly 22 includes a plurality of articulated arm members 50 which are serially connected to each other and which are connected between the vertical-to-horizontal swivel assembly 16 and the adjustable-length article-holding assembly 24. A plurality of arm lock assemblies 52 are connected to adjacent articulated arm members 50 for locking selected orientations of adjacent articulated arm members 50 with respect to each other.

The adjustable-length article-holding assembly 24 is connected to the adjustable horizontal arm assembly 22 by a rotatably adjustable connection 29 along a rotational axis 27 extending through an end portion of the adjustable horizontal arm assembly 22 and an end portion of the adjustable-length article-holding assembly 24. A swivel-to-horizontal-arm lock assembly 25 is connected to the adjustable horizontal arm assembly 22 for locking a connection between the adjustable horizontal arm assembly 22 and the vertical-to-horizontal swivel assembly 16.

In using the first embodiment of the invention, the adjustable-length article-holding assembly 24 is adjusted to accommodate a book 78. More specifically, the locking assembly 34 is loosened. The second telescopic member 32 is extended with respect to the first telescopic member 28 by an appropriate length to accommodate the book 78, and the locking assembly 34 is relocked. Then, the book 78 is held on the adjustable-length article-holding assembly 24 by the first clamp assembly 30 and the second clamp assembly 36. The first clamp assembly 30 and the second clamp assembly 36 are conventional screw clamp assemblies as shown in the drawings.

The person reading the book selects a comfortable position or orientation for hands-free reading, and the adjustable article-holding stand apparatus 10 of the invention is adjusted accordingly. More specifically, the height of the adjustable vertical riser assembly 14 is adjusted by varying the effective length of the adjustable vertical riser assembly 14 by adjusting the telescoping riser members 44 with respect to each other. The riser lock assemblies 48 are loosened to make the adjustments and are retightened after the height adjustments are made.

Referring to FIG. 1, the horizontal adjustments are made by loosening the arm lock assemblies 52, by adjusting the articulated arm members 50, and by retightening the arm lock assemblies 52. It is noted that variations in the articulation angles between adjacent articulated arm members 50 also have an effect on the height of the book 78. The angle of the book 78 with respect to the adjustable horizontal arm assembly 22 is adjusted by turning the adjustable-length article-holding assembly 24 on a rotational axis 27 extending through an end portion of the adjustable horizontal arm assembly 22 and an end portion of the adjustable-length article-holding assembly 24.

If greater stability in a free-standing apparatus is needed because of the location of the center of gravity of the apparatus and article in combination, then the base-leg-adjustment lock assembly 46 is loosened, the adjustable base portion 42 is extended away from the primary base portion 40 toward the adjustable-length article-holding assembly 24 in a plane parallel to the adjustable-length article-holding assembly 24, and the base-leg-adjustment lock assembly 46 is retightened.

As shown in FIG. 7, an auxiliary-device-adaptor assembly 60 is employed, and a magnifying glass assembly 62 is connected to the auxiliary-device-adaptor assembly 60. It is contemplated that other auxiliary devices may be used with the other types of auxiliary-device-adaptor assemblies is connected to the article-holding assembly 24. For example, other auxiliary devices can include a pen, a small radio, a small fan, and an extra lamp assembly, etc.

Figures 5, 5A, 6:
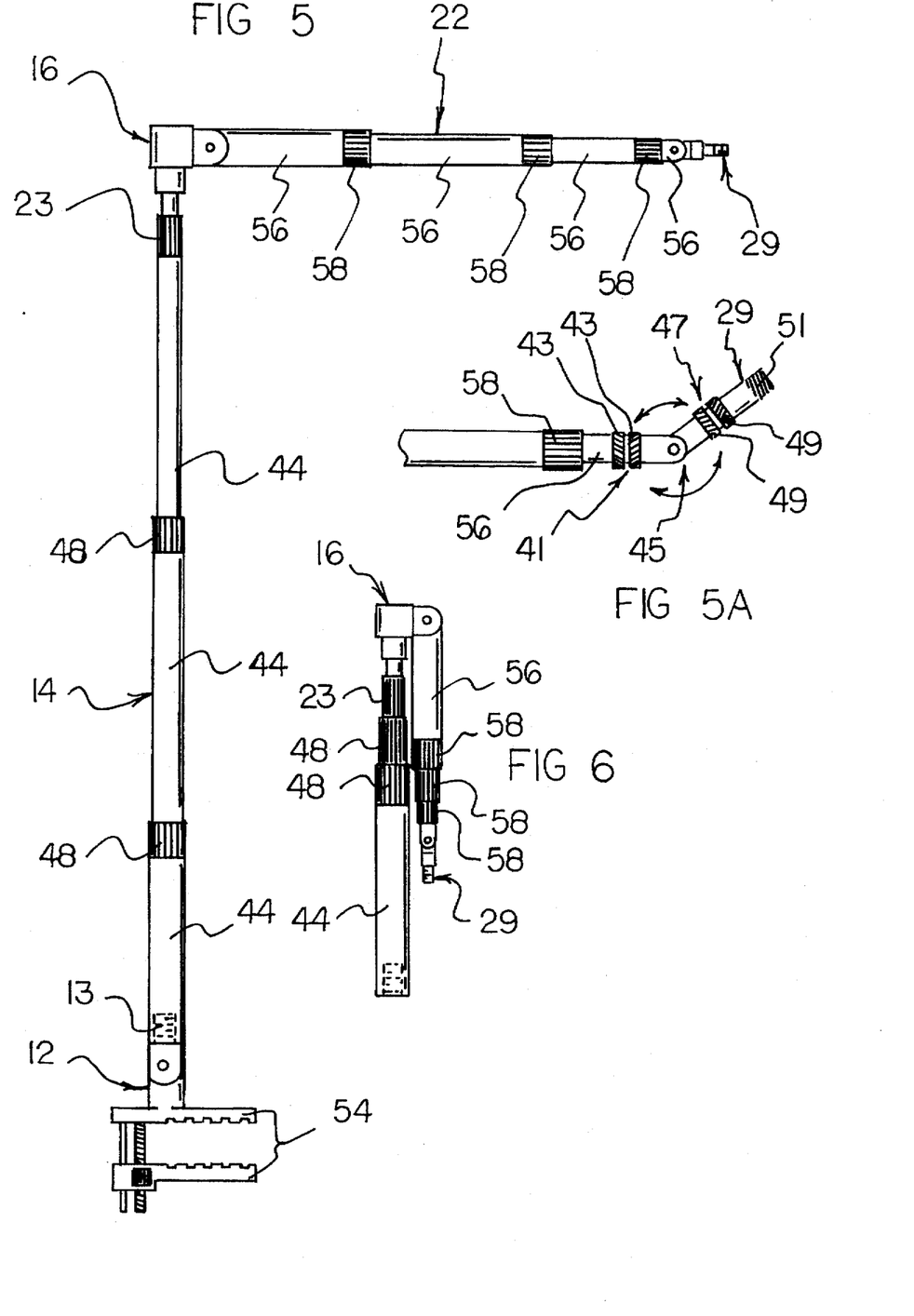
FIG. 5 is a side view of a portion of a second embodiment of the adjustable article-holding stand apparatus of the invention in an expanded state.
FIG. 5A is a side close-up view of an alternative embodiment of a rotatably adjustable connection of the invention.
FIG. 6 is a side view of the embodiment of the invention shown in FIG. 5 in a contracted state.

Moreover, other auxiliary devices can be attached to the adjustable connection 29 such as shown in FIG. 5. Such other devices include cameras, video recorders, modified lap top computers, and modified television sets.

Turning to FIGS. 5 and 6, a second embodiment of the invention is shown. Reference numerals are shown that correspond to like reference numerals that designate like elements shown in the other figures. In the second embodiment, The base assembly 12 includes a substrate-gripper assembly 54 connected to the adjustable vertical riser assembly 14. The adjustable horizontal arm assembly 22 includes a plurality of telescoping arm members 56 serially connected to each other and connected between the vertical-to-horizontal swivel assembly 16 and the adjustable-length article-holding assembly 24. A plurality of telescopic arm lock assemblies 58 are connected to selected telescoping arm members 56 for locking adjacent telescoping arm members 56 to each other.

The second embodiment of the invention is shown in an extended configuration in FIG. 5 and is shown in a collapsed configuration in FIG. 6. The collapsed configuration is useful when the adjustable article-holding stand apparatus of the invention is placed in storage or is transported from one location to another.

In another variation of the invention, FIG. 5A shows an alternative embodiment of a rotatably adjustable connection. More specifically, the rotatably adjustable connection 29 includes a first swivel 41 which includes a pair of lock nuts 43. A second swivel 47 includes a pair of lock nuts 49. A threaded male end 51 is also provided. A hinged joint assembly 45 is provided between the first swivel 41 and the second swivel 47.

In using the second embodiment of the invention, the base assembly 12 is clamped to a substrate, which is ordinarily a horizontal or vertical support surface such as a table top or a desk top. The substrate-gripper assembly 54 is used for connecting the base assembly 12 to the horizontal surface or vertical. The adjustable vertical riser assembly 14 of the second embodiment operates substantially the same as the adjustable vertical riser assembly 14 in the first embodiment. Moreover, since the adjustable horizontal arm assembly 22 in the second embodiment is composed of telescopic members and locks for the telescopic members, the adjustable horizontal arm assembly 22 operates in a horizontal and also sub-horizontal direction substantially the same way that the adjustable vertical riser assembly 14 operates in the vertical direction. The telescopic nature of the adjustable vertical riser assembly 14 and the adjustable horizontal arm assembly 22 permit the second embodiment of the invention to be contracted into a small, compact state as shown in FIG. 6.

As shown in FIGS. 1 and 5, each base assembly 12 is connected to the adjustable vertical riser assembly 14 by a threaded stud 13 on the vertical riser assembly 14 that screws into an adaptor portion on the base assembly 12. As a result, the floor-supported base assembly 12 can be unscrewed from the adjustable vertical riser assembly 14, and the desk-supported base assembly 12 can be screwed into the adjustable vertical riser assembly 14 in its place. Clearly, then, the floor-supported base assembly 12 and the desk-supported base assembly 12 are interchangeable. They can be included together in a kit, whereby a user has a choice as to which base assembly 12 which will be used for a selected application.

In another embodiment of the invention, a small model may be provided that is designed to be used on a table top. The small table top model is designed primarily for use with paperback books and other small to medium weight books or articles. A small adjusting arm can be removed and replaced with a larger arm for holding larger books. The small, table top model can be collapsible, and its components can be stored in a convenient carrying case which may be small enough to fit into one's pocket. Such a small model would be very suitable for restaurant goers, students, or business people.

A suitable small model of the invention can be used in automobiles. Such an embodiment for use in a vehicle may be supported by a dashboard for front passengers or may be supported by the back of a front seat for use by a passenger seated in the rear of the automobile.

The components of the adjustable article-holding stand apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved adjustable article-holding stand apparatus that is low in cost, relatively simple in design and operation, and which may advantageously be used to permit a person to read a book in a hands-free manner with the person being oriented in a wide variety of orientations. With the invention, an adjustable article-holding stand apparatus is provided which has a horizontal adjustment. With the invention, an adjustable article-holding stand apparatus is provided which is not supported by a mattress of a bed. With the invention, an adjustable article-holding stand apparatus is provided which is not supported by the frame of a bed. With the invention, an adjustable article-holding stand apparatus is provided which avoids the use of flexible suspension lines. With the invention, an adjustable article-holding stand apparatus is provided which is supported by a floor. With the invention, an adjustable article-holding stand apparatus is provided which can optionally be supported by a desk, table, or other elevated horizontal surface. With the invention, an adjustable article-holding stand apparatus provides adjustability for both vertical adjustment and horizontal adjustment for a book reader or article user who is in a wide variety of personal orientations. With the invention, an adjustable article-holding stand apparatus provides adjustability for a wide variety of books or other articles to be held. With the invention, an adjustable article-holding stand apparatus is provided which has a base whose length is adjustable.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. An adjustable article-holding stand apparatus, comprising:

a base assembly, an adjustable vertical riser assembly connected to said base assembly, a vertical-to-horizontal swivel assembly having a first portion and a second portion, wherein said first portion of said vertical-to-horizontal swivel assembly is connected to said adjustable vertical riser assembly, an adjustable horizontal arm assembly connected to said second portion of said vertical-to-horizontal swivel assembly, and an adjustable-length article-holding assembly connected to said adjustable horizontal arm assembly, wherein said adjustable-length article-holding assembly includes an auxiliary-device-adaptor assembly connected thereto.

2. The apparatus of claim 1, farther including:

a swivel-to-vertical-riser lock assembly connected to said adjustable vertical riser assembly for locking a connection between said adjustable vertical riser assembly and said vertical-to-horizontal swivel assembly.

3. The apparatus of claim 1 wherein said adjustable-length article-holding assembly includes:

a connector portion for connecting said adjustable-length article-holding assembly to said adjustable horizontal arm assembly, a first telescopic member connected to said connector portion, a first clamp assembly connected to said first telescopic member, a second telescopic member slidingly connected to said first telescopic member, a locking assembly for locking said second telescopic member with respect to said first telescopic member, and a second clamp assembly connected to said second telescopic member.

4. The apparatus of claim 3 wherein said first clamp assembly and said second clamp assembly include spring damp members.

5. The apparatus of claim 1 wherein said auxiliary-device-adaptor assembly is connected to an end portion of a second clamp assembly.

6. The apparatus of claim 1, further including:

a magnifying glass assembly .connected to said auxiliary-device-adaptor assembly.

7. The apparatus of claim 6 wherein said magnifying glass assembly includes:

an extension arm rotatably connected to said auxiliary-device-adaptor assembly, and a magnifying lens assembly connected to said extension arm.

8. The apparatus of claim 1, further including:

a lamp assembly connected to said adjustable-length article-holding assembly.

9. The apparatus of claim 1 wherein said base assembly extends sufficiently horizontally such that said base assembly extends beyond a center of gravity of the apparatus such that said base assembly supports the apparatus in a free-standing manner.

10. The apparatus of claim 1 wherein said base assembly includes:

primary base portion connected to said adjustable vertical riser assembly, and an adjustable base portion adjustably connected to said primary base portion.

11. The apparatus of claim 10 wherein said primary base portion includes a plurality of connector members arrayed along a top surface of said primary base portion.

12. The apparatus of claim 10, further including:

a base-leg-adjustment leek assembly which is supported by said primary base portion for locking an adjusted position of said adjustable base portion with respect to said primary base portion.

13. The apparatus of claim 12, further including:

an adjustable foot assembly adjustably connected to said adjustable base portion.

14. The apparatus of claim 1 wherein said adjustable vertical riser assembly includes:

a plurality of telescoping riser members serially connected to each other and connected between said base assembly and said adjustable horizontal arm assembly, and a plurality of riser lock assemblies connected to said telescoping riser members for locking adjacent telescoping riser members to each other.

15. The apparatus of claim 1 wherein said adjustable horizontal arm assembly includes:

a plurality of articulated arm members serially connected to each other and connected between said vertical-to-horizontal swivel assembly and said adjustable-length article-holding assembly, and a plurality of arm lock assemblies connected to said articulated arm members for locking selected orientations of adjacent articulated arm members with respect to each other.

16. The apparatus of claim 1 wherein said adjustable-length article-holding assembly is connected to said adjustable horizontal arm assembly by a rotatably adjustable connection along a rotational axis extending through an end portion of said adjustable horizontal arm assembly and an end portion of said adjustable-length article-holding assembly.

17. The apparatus of claim 16, further including:

a swivel-to-horizontal-arm lock assembly connected to said adjustable horizontal arm assembly for locking a connection between said adjustable horizontal arm assembly and said vertical-to-horizontal swivel assembly.

18. The apparatus of claim 1 wherein said base assembly includes a substrate-gripper assembly connected to said adjustable vertical riser assembly.

19. The apparatus of claim 1 wherein said adjustable horizontal arm assembly includes:

a plurality of telescoping arm members serially connected to each other and connected between said vertical-to-horizontal swivel assembly and said adjustable-length article-holding assembly, and a plurality of telescopic arm lock assemblies connected to said telescoping arm members for locking adjacent telescoping arm members to each other.

* * * * *